United States Patent [19]

Asanuma et al.

[11] Patent Number: 5,206,324
[45] Date of Patent: Apr. 27, 1993

[54] BUTENE-1 COPOLYMER AND RESIN COMPOSITION CONTAINING THE SAME

[75] Inventors: Tadashi Asanuma, Takaishi; Tetsunosuke Shiomura, Tokyo; Tateyo Sasaki, Takaishi; Tutomu Iwatani, Takaishi; Nobutaka Uchikawa, Takaishi; Kouji Kitabayashi, Takaishi, all of Japan

[73] Assignee: Mitsui Toatsu Chemicals, Inc., Tokyo, Japan

[21] Appl. No.: 592,315

[22] Filed: Oct. 3, 1990

[30] Foreign Application Priority Data

Oct. 6, 1989 [JP] Japan .................................. 1-260202

[51] Int. Cl.$^5$ .................... C08F 210/06; C08F 210/08
[52] U.S. Cl. .................................... 526/348.6; 526/160
[58] Field of Search ........................ 526/348.6

[56] References Cited

U.S. PATENT DOCUMENTS

| | | | |
|---|---|---|---|
| 3,332,921 | 7/1967 | Cleary | 260/88.2 |
| 3,464,962 | 9/1969 | Geacintov et al. | 260/88.2 |
| 4,892,851 | 1/1990 | Ewen et al. | 526/160 |
| 4,975,492 | 12/1990 | Kondo et al. | 526/348.6 |

FOREIGN PATENT DOCUMENTS

| | | |
|---|---|---|
| 135358 | 3/1985 | European Pat. Off. . |
| 0233400 | 8/1987 | European Pat. Off. . |
| 328348 | 8/1989 | European Pat. Off. . |
| 335484 | 10/1989 | European Pat. Off. . |
| 119213 | 5/1987 | Japan . |
| 8602595 | 5/1986 | World Int. Prop. O. . |

OTHER PUBLICATIONS

Patent Abstracts of Japan, vol. 11, No. 349, Nov. 14, 1987 & JPA 62119213, May 30, 1987.

Primary Examiner—Joseph L. Schofer
Assistant Examiner—David Wu
Attorney, Agent, or Firm—Burns, Doane, Swecker & Mathis

[57] ABSTRACT

Copolymers of butene-1 and propylene, having specific physical properties and substantially a syndiotactic structure; and easily heat-sealable polypropylene resin compositions comprising 5-50 parts by weight of one of the copolymers and 95-50 parts by weight of a stereoregular crystalline propylene-ethylene copolymer or propylene-ethylene-$C_{4-12}$-$\alpha$-olefin copolymer having specific compositions and melt flow index.

4 Claims, No Drawings

BUTENE-1 COPOLYMER AND RESIN COMPOSITION CONTAINING THE SAME

BACKGROUND OF THE INVENTION a) Field of the Invention

The present invention relate to copolymers of butene-1 and propylene and also to heat-sealable polypropylene resin compositions containing one or more of the copolymers and useful as heat-sealing layers for heat-bonding polyolefins.

b) Description of the Related Art

The existence of α-olefin polymers having a syndiotactic structure has been known for many years, including syndiotactic polypropylene by way of example. Syndiotactic polypropylene can be obtained by conducting polymerization at a low temperature in the presence a conventional catalyst composed of a vanadium compound, ether and an organoaluminum compound. This polypropylene however has poor syndiotacticity so that it can hardly be considered to have the properties of a syndiotactic polypropylene.

J. A. Ewen et al. has found for the first time that polypropylene having such good tacticity as exceeding 0.8 in terms of syndiotactic pentad fraction as measured by $^{13}$C-NMR can be obtained by polymerizing propylene in the presence of a polymerization catalyst composed of methyl aluminoxane and a transition metal (Hf and Zr) compound having an asymmetric ligand (J. Amer. Chem. Soc., 110, 6255-6, 1988).

In the meantime, it has been found by the present inventors that polybutene-1 having high syndiotacticity can be obtained when butene-1 is polymerized using the above catalyst in a high-purity form. This catalyst has good activity per transition metal and, moreover, the resultant polybutene-1 has high tacticity. However, the balancing of physical properties of the polybutene-1 is rather poor and articles molded from the polybutene-1 have insufficient transparency.

Polypropylene resins which substantially have stereoregularity, namely, either an isotactic structure or a syndiotactic structure have excellent stiffness and are superior in external appearance such as transparency and gloss. They are hence used for various applications. For films, propylene-ethylene copolymers are used to improve impact resistance and heat sealability. As resins having excellent balance among stiffness, impact resistance and heat sealability, propylene-ethylene-butene-1 terpolymers are known by way of example.

Although these copolymers have excellent balance among stiffness, impact resistance and heat sealability, it is desired to improve the heat sealability further so that the efficiency in the use of films can be improved.

SUMMARY OF THE INVENTION

An object of the present invention is to provide a copolymer of butene-1 and propylene, which has excellent impact resistance and good transparency and substantially has a syndiotactic structure.

Another object of the present invention is to provide a heat-sealable polypropylene resin composition excellent not only in heat sealability but also in other physical properties.

Other objects will become apparent from the following description of the present invention.

In one aspect of the present invention, there is provided a copolymer of butene-1 and propylene, wherein, of an absorption of the side-chain methylene groups of butene-1 units of said copolymer as measured in the form of a 1,2,4-trichlorobenzene solution by $^{13}$C-NMR, the intensity of an absorption observed at about 26.9 ppm using tetramethylsilane as a standard is at least 0.3 of the intensity of a full absorption of the side-chain methylene groups observed at about 27.8-26.0 ppm using tetramethylsilane as a standard; the content of propylene units ranges from 0.1 wt.% to 20 wt.%; and the intrinsic viscosity as measured at 135° C. in the form of a tetralin solution is at least 0.05.

In another aspect of the present invention, there is also provided a heat-sealable polypropylene resin composition comprising 95-50 parts by weight of substantially stereoregular crystalline polypropylene composed of 98-80 wt.% of propylene units, 0-18 wt.% of α-olefin units having 4-12 carbon atoms and 2-20 wt.% of ethylene units and a melt flow index of 0.1-100 g/10 min as measured at 230° C.; and 5-50 parts by weight of the above butene-1-propylene copolymer.

DESCRIPTION OF THE PREFERRED EMBODIMENTS

The butene-1-propylene copolymer of the present invention, which substantially has a syndiotactic structure, can be obtained by copolymerizing butene-1 and propylene in the presence of a catalyst. Although the compounds disclosed in the literature by J. A. Ewen et al. can be mentioned as exemplary polymerization catalysts, other catalyst systems can also be used even when they have a different structure, as long as they can afford propylene butene-1 homopolymer having relatively high tacticity of at least 0.5 or so in terms of syndiotactic pentad fraction [A. Zambelli et al.: Macromolecules, 6, 925 (1973); ibid., 8, 687 (1975)]. For example, catalyst systems formed of an aluminoxane and a transition metal compound having an asymmetric ligand are effective.

Illustrative transition metal compounds suitable for the production of the copolymers of the present invention include isopropyl(cyclopentadienyl-1-fluorenyl)hafnium dichloride and isopropyl(cyclopentadienyl-1-fluorenyl)zirconium dichloride described in the above publications as well as those obtained by substituting one or both of their chlorine atoms with the corresponding number of other halogen atoms or $C_{1-5}$-alkyl groups.

Exemplary aluminoxanes include the compounds represented by the following formula:

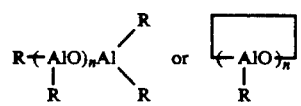

wherein R is a hydrocarbon residual group having 1-3 carbon atoms. Especially, methylaluminoxanes of the above formula in which R is a methyl group and n is at least 5, preferably 10 or greater are used.

The aluminoxane can be used in a proportion of 10-1,000,000 molar times, usually 50-5,000 molar times the transition metal compound.

No particular limitation is imposed on the polymerization conditions. The polymerization can be conducted by polymerization in the presence of an inert solvent, by bulk polymerization in a polymerization system substantially free of inert solvent, or by vapor-phase polymerization. Generally, the polymerization temperature may range from −100° C. to 200° C. and the polymerization pressure from normal pressure to 100 kg/cm$^2$-G. Polymerization at −100° C. to 100° C. and normal pressure to 50 kg/cm$^2$-G is particularly preferred.

Upon polymerization, it is important to control the feed rate of each monomer into a polymerization system so that the content of propylene units in the resulting copolymer can be 0.1–20 wt.%, preferably 1–20 wt.%. It is also important to control the feed ratio of the monomers, the polymerization temperature and the like so that, of an absorption of the side-chain methylene groups of butene-1 units of said copolymer as measured in the form of a 1,2,4-trichlorobenzene solution by $^{13}$C-NMR, the intensity of an absorption observed at about 26.9 ppm using tetramethylsilane as a standard is at least 0.3, preferably at least 0.4 of the intensity of a full absorption of the side-chain methylene groups observed at about 27.8–26.0 ppm using tetramethylsilane as a standard; the content of propylene units ranges from 0 1 wt.% to 20 wt.%; and the intrinsic viscosity as measured at 135° C. in the form of a tetralin solution is at least 0.05. Further, it is desirable to treat the resultant copolymer, for example, by washing it with a solvent such as a $C_{3-20}$ hydrocarbon. Usable exemplary hydrocarbon solvents include propylene itself; saturated aliphatic hydrocarbons such as propane, butane, pentane, hexane, heptane, octane and nonane; aromatic hydrocarbons such as benzene, toluene, xylene and ethylbenzene; and those obtained by either partially or wholly substituting the hydrogen atoms of such saturated aliphatic hydrocarbons or aromatic hydrocarbons with fluorine, chlorine, bromine and/or iodine atoms. Other exemplary usable solvents include low molecular-weight compounds capable of either dissolving or dispersing the atactic component, such as $C_{1-20}$ alcohols, $C_{2-20}$ ethers and esters. No particular limitation is imposed on the washing method. Generally, the washing can be conducted at 0°–100° C.

Polymerization at a relatively low temperature, usually at 100° C. or lower in the presence of a catalyst having high purity, normally of 90% or higher is also effective for obtaining the above copolymer.

In the butene-1-propylene copolymer of the present invention, the continuous chain of butene-1 units substantially has a syndiotactic structure. This copolymer is defined as follows. Namely, of an absorption of side-chain methylene groups of butene-1 units of the copolymer as measured in the form of a 1,2,4-trichlorobenzene solution by $^{13}$C-NMR, the intensity of an absorption observed at about 26.9 ppm using tetramethylsilane as a standard is at least 0.3 of the intensity of a full absorption of the side-chain methylene groups observed at about 27.8–26.0 ppm using tetramethylsilane as a standard, the content of propylene units ranges from 0.1 wt.% to 20 wt.%, and the intrinsic viscosity as measured at 135° C. in the form of a tetralin solution is at least 0.05. If the parameter specified as an index for syndiotacticity on the basis of the results of $^{13}$C-NMR measurement is smaller than 0.3, the balancing of physical properties will become poorer. Intrinsic viscosities lower than 0.05 will result in compositions having inferior physical properties, especially will lead to poor anti-blocking property when formed into films. Such low intrinsic viscosities are therefore not preferred. The upper limit of the intrinsic viscosity may be 5 or so. Propylene unit contents lower than 0.1 wt.% will be too little to significantly improve the transparency of the polymer, whereas propylene unit contents higher than 20 wt.% will lead to insufficient stiffness. The number-average molecular weight as measured by gel permeation chromatography in propylene can preferably be at least 1,000, especially 5,000 or higher. The ratio of the weight-average molecular weight to the number-average molecular weight (hereinafter abbreviated as "Mw/Mn") can preferably be 1.5–10.

The substantially stereoregular crystalline polypropylene employed as a component in the polypropylene resin composition of the present invention may be either polypropylene of substantially an isotactic structure or polypropylene of substantially a syndiotactic structure. The crystalline polypropylene contains 98–80 wt.% of propylene units, 0–18 wt.% of α-olefin units and 2–20 wt.% of ethylene units and has a melt flow index of 0.1–100 g/10 min as measured at 230° C.

The term "polypropylene of substantially an isotactic structure" means polypropylene which shows at about 21.4 ppm an absorption attributed principally to the methyl groups of propylene units on a $^{13}$C-NMR spectrum, while the term "polypropylene of substantially a syndiotactic structure" means polypropylene which presents the above absorption at 20.2 ppm.

Polypropylene substantially having an isotactic structure can be produced by a process well known in the art, for example, by polymerizing propylene and ethylene and, if desired, a $C_{4-12}$ α-olefin in the presence of a catalyst, which is formed of titanium trichloride or its modified product or titanium tetrachloride supported together with an electrondonating compound on a carrier such as magnesium chloride, in combination with an organoaluminum compound and, if necessary, an electron-donating compound. Various commercial products are available as such polypropylene.

On the other hand, polypropylene substantially having a syndiotactic structure can be produced by polymerizing propylene and ethylene and, if desired, a $C_{4-12}$ α-olefin in the presence of a similar catalyst under similar polymerization conditions to those employed in the copolymerization of butene-1 and propylene.

The substantially stereoregular polypropylene must contain 98–80 wt.% of propylene units, 0–18 wt.% of $C_{4-12}$ α-olefin units and 2–20 wt.% of ethylene units. Propylene unit contents lower than 80 wt.% will result in formed articles having poor stiffness. On the other hand, propylene unit contents higher than 98 wt.% will lead to formed articles having poor impact resistance. $C_{4-12}$ α-olefin unit contents higher than 18 wt.% will result in formed articles having poor stiffness. Ethylene unit contents lower than 2 wt.% will lead to poor impact resistance and heat sealability, while ethylene unit contents higher than 20 wt.% will result in formed articles having poor stiffness. Further, from the standpoint of moldability, the melt flow index as measured at 230° C. must be 0.1–100 g/10 min. Formation into films will become difficult if the melt flow index is outside the above range, no matter whether it is smaller than 0.1 g/10 min or greater than 100 g/10 min.

The preferable ranges of the respective units in the substantially stereoregular crystalline polypropylene are 97–85 wt.% for the propylene units, 0–15 wt.% for the $C_{4-12}$ α-olefin units, and 3–15 wt.% for the ethylene units. The preferable range of the melt flow index is 1–50 g/10 min.

Regarding the blending proportions of the substantially stereoregular crystalline polypropylene and the butene-1-propylene copolymer of a substantially syndiotactic structure, it is necessary to blend 95-50 parts by weight of the former resin with 5-50 parts by weight of the latter resin. If the proportion of the former resin is greater than 95 parts by weight, no significant effects will be exhibited for the improvement in heat sealability. Proportions smaller than 50 parts by weight will result in poor physical properties such as poor stiffness and anti-blocking property. The preferable blending proportions are 90-60 parts by weight for the substantially stereoregular crystalline polypropylene and 10-40 parts by weight for the butene 1-propylene copolymer substantially having the syndiotactic structure.

For blending the substantially stereoregular crystalline polypropylene with the butene-1-propylene copolymer substantially having the syndiotactic structure, various conventional methods can be used. Namely, they can be mixed first in a Henschel mixer or the like and then melted and mixed in an extruder. As an alternative, they can be mixed in a Brabender or Banbury mixer.

The resin composition of the present invention may contain, in addition to the above polymers, one or more of known additives such as antioxidants, ultraviolet absorbers, anti-blocking agents and slip agents, depending on the end use of the composition.

The butene-1 copolymer of the present invention can also be used as formed articles such as films. The polypropylene composition of the present invention is useful as heat-sealing layers upon heat-bonding Examples of the present invention will hereinafter be described. It is however to be noted that these examples are merely illustrative of the present invention and shall not be taken as limiting the present invention.

EXAMPLE 1

Isopropylcyclopentadienyl-1-fluorene which had been synthesized in a manner known per se in the art was converted to the lithium salt. The lithium salt was reacted with zirconium tetrachloride, followed by purification to obtain isopropyl(cyclopentadienyl-1-fluorenyl)zirconium dichloride. In an autoclave having an internal capacity of 2 l, 5 mg of the isopropyl(cyclopentadienyl-1-fluorenyl)zirconium dichloride and 0.67 g of methylaluminoxane having a polymerization degree of about 16 (product of TOSOHAKZO CORPORATION) were dissolved in 1 l of toluene. Into the autoclave, 25 g of propylene were charged at 30° C., followed by the charging of 460 g of butene-1 under pressure. They were polymerized for 1 hour. After the polymerization, unreacted monomers were purged and 500 ml of methanol were added. The resultant mixture was filtered. The obtained polymer was dried at 80° C. under reduced pressure so that 44.4 g of a copolymer were obtained.

On a $^{13}$C-NMR spectrum of the copolymer as measured in the form of a 1,2,4-trichlorobenzene solution, the intensity of an absorption observed at about 26.9 ppm using tetramethylsilane as a standard was 0.67 of the intensity of a full absorption observed at about 27.8-26.0 ppm. The copolymer contained 6.0 wt.% of propylene. In addition, its intrinsic viscosity (hereinafter abbreviated as ) as measured at 135° C. in the form of a tetralin solution was 0.65. Its Mw/Mn as measured in the form of a 1,2,4-trichlorobenzene solution at 135° C. by gel permeation chromatography was 2.1.

The copolymer was press-formed at 210° C. to produce a 1 mm thick sheet. The following physical properties were then measured by the corresponding methods which are indicated following the respective properties.

Tensile yield strength, kg/cm$^2$: ASTM D638 (23° C.)

| | |
|---|---|
| Elongation, %: | ASTM D638 (23° C.) |
| Izod impact strength (notched), kg · cm/cm: | ASTM D256 (23° C., −10° C.) |
| Haze, %: | ASTM D1003 |

The copolymer had 30 kg/cm$^2$ tensile yield strength, 47% elongation, 56 and 68 kg.cm/cm Izod impact strengths (at 23° C. and −10° C., respectively), and 30% haze.

COMPARATIVE EXAMPLE 1

Polymerization was conducted in a similar manner to Example 1 except for the omission of propylene, so that a polymer having a syndiotactic pentad fraction of 0.89 and an Mw/Mn ratio of 1.5 was obtained. Its physical properties were measured in a similar manner to Example 1. The polymer had 108 kg/cm$^2$ tensile yield strength, 38% elongation, 48 and 2.8 kg.cm/cm Izod impact strengths (at 23° C. and −10° C., respectively), and 68% haze.

It is apparent from the foregoing results that the butene-1 copolymer of the present invention has greater Izod impact strength and superior transparency compared with the homopolymer of butene-1.

Evaluation methods for the physical properties of films in the examples and comparative examples will next be described.

Powder of each resin composition or copolymer was added with a phenolic stabilizer at a weight ratio of 20/10,000, calcium stearate at a weight ratio of 5/10,000, a lubricant at a weight ratio of 9/10,000 and as an anti-blocking agent, fine powder of silicon dioxide at a weight ratio of 25/10,000. They were mixed at 30°-40° C. for 4 minutes in a 20 l Henschel mixer (manufactured by Mitsui-Miike Engineering Corporation). The mass thus obtained was kneaded and pelletized by a single-screw granulating machine having a diameter of 65 mm (manufactured by Toshiba Machine Co., Ltd.). Using a single-screw film-forming machine having a diameter of 40 mm (manufactured by Osaka Seiki K.K.), the pellets were formed at a resin temperature of 250° C. into a film of 30 μm thick and 25 cm wide by T-die extrusion. Its physical properties were evaluated. The following methods were followed to measure the respective physical properties.

Haze, %:
ASTM 1003-53.
Blocking tendency, %:
Two films, each 200 mm square wide, were placed in a superposed relation on an iron plate. As a weight, an iron plate of 200 mm square wide and 2 kg heavy was placed over the films. After 24 hours, the percentage of close contact areas was calculated as the blocking tendency.
Young's modulus, kg/mm.$^2$
Measured by an Instron-type universal tension and compression testing machine, using films of 20 mm ×220 mm wide.
Blooming:
Visually judged after each film was held at 50° C. for 30 days.
Heat sealing temperature:

Measured by a heat-gradient testing machine manufactured by Toyo Seiki Seisaku-Sho, Ltd. Incidentally, the heat sea.ling was conducted for 1 second under 2 kg/cm². The strength of heat seal of each heatsealed sample was measured by the Instron-type universal tension and compression testing machine.

Hot tack:

A heat seal tester manufactured by Tester Sangyo K.K. was used. The samples were pressed for 1 second under a heat sealing pressure of 1 kg/cm². The lowest temperature capable of providing a heat seal resistant to separation under a peeling load of 45 g was recorded.

Melt flow rate:

Measured at 230° C. under the load of 2.16 kg in accordance with ASTM D1238-65T.

EXAMPLE 2

Preparation of catalyst

An oscillation mill equipped with four grinding pots which had an internal capacity of 4 l and containing 9 kg of steel balls having a diameter of 12 mm was provided. In a nitrogen gas atmosphere, 300 g of magnesium chloride, 115 ml of diisobutyl phthalate and 60 ml of titanium tetrachloride were added into each pot and were ground for 40 hours.

Five grams of the above ground mixture were placed in a 200 ml flask, followed by the addition of 100 ml of toluene. The contents Were stirred at 114° C. for 30 minutes and then allowed to stand. The supernatant was removed. Using 100 ml of n-heptane, the solid thus obtained was washed three times at 20° C. The solid was then dispersed in 100 ml of n-heptane, so that a slurry of the transition metal catalyst was formed. The transition metal catalyst thus obtained contained 1.8 wt.% of titanium and 18 wt.% of diisobutyl phthalate.

Production of propylene copolymer

As a preparatory procedure for polymerization, 25 kg of propylene and 3.4 kg of butene-1 were charged in a jacketed autoclave which had an internal capacity of 100 l and had been dried thoroughly, purged with nitrogen gas and then with propylene.

On the other hand, 500 ml of n-heptane, 4.7 ml of triethylaluminum, 2.3 ml of cyclohexylmethyldimethoxysilane and 0.35 g, as solid weight, of the transition metal catalyst obtained above under "Preparation of catalyst" were mixed in a 1 l flask. The resulting mixture was charged under pressure into the autoclave prepared above and having the internal volume of 100 l. After 30 g of hydrogen and 300 g of ethylene were charged, polymerization was conducted by continuously charging propylene at a velocity of 5 kg/hr while maintaining the internal temperature at 65° C. by circulating hot water through the jacket and also charging hydrogen, ethylene and butene-1 such that their vapor-phase concentrations can be maintained at 2.3 mole % for hydrogen, 1.5 mole % for ethylene and 13.5 mole % for butene-1. Upon elapsed time of 3 hours, 3.5 ml of diethylene glycol monoisopropyl ether were charged under pressure, followed by stirring at 60° C. for additional 30 minutes to complete the polymerization.

The resultant copolymer slurry was introduced at a rate of 50 kg/hr through a top part of a countercurrent washing column which had a thin section having an inner diameter of 15 cm and a length of 5 m and an upper thick section having an inner diameter of 30 cm and a length of 1 m. Introduced at a rate of 100 kg/hr through a bottom part was a washing liquid formed of 89 mole % of propylene, 5 mole % of propane, 1 mole % of ethylene and 15 mole % of butene-1. The washing liquid was discharged at a rate of 110 kg/hr through the top of the column, while the thus-washed copolymer slurry was taken out at a rate of 40 kg/hr through the bottom of the column. Via a double-wall cylinder which had an outer cylinder having an inner diameter of 20 cm and a length of 60 mm and was heated with steam circulated at 1 kg/cm²G through the outer cylinder, the copolymer slurry thus withdrawn was released into a cyclone which was maintained at the atmospheric pressure. The resulting powder was dried further at 50° C. and 60 mm Hg for 10 hours, whereby 13.5 kg of a copolymer was obtained.

The copolymer had 2.1 wt.% ethylene content, 1.6 wt.% of butene content, 1.63 intrinsic viscosity and 5.7 melt flow index. It was formed into a film. The physical properties of the film were measured, indicating 2.0% haze, 10% blocking tendency, 69 kg/mm² Young's modulus, 132.8° C. heat sealing temperature, no blooming, and 142.5° C. hot tack temperature.

Production of butene-1-propylene copolymer

Isopropylcyclopentadienyl-1-fluorene which had been synthesized in a manner known per se in the art was converted to the lithium salt. The lithium salt was reacted with zirconium tetrachloride, followed by purification to obtain isopropyl(cyclopentadienyl-1-fluorenyl)zirconium dichloride. In an autoclave having an internal capacity of 2 l, 5 mg of the isopropyl(cyclopentadienyl-1-fluorenyl)zirconium dichloride and 0.67 g of methyl aluminoxane having a polymerization degree of about 16 (product of TOSOHAKZO CORPORATION) were dissolved in 1 l of toluene. Into the autoclave, 30 g of propylene were charged at 30° C., followed by the charging of 460 g of butene-1 under pressure. They were polymerized for 1 hour. After the polymerization, unreacted monomers were purged and 500 ml of methanol were added. The resultant mixture was filtered. The resulting solid was dried at 80° C. under reduced pressure so that 46.8 g of a copolymer were obtained.

On a $^{13}C$-NMR spectrum of the copolymer as measured in the form of a 1,2,4-trichlorobenzene solution, the intensity of an absorption observed at about 26.9 ppm using tetramethylsilane as a standard was 0.67 of the intensity of an absorption observed at about 27.8–26.0 ppm. The copolymer contained 9.5 wt.% of propylene. In addition, its $\eta$ was 0.68 and its Mw/Mn was 2.1.

Preparation of resin composition

Twenty parts by weight of the above butene-1-propylene copolymer were blended with 80 parts by weight of the above propylene copolymer. The resultant composition was formed into a film, and physical properties of the film were measured. The film had 2.1% haze, 10% blocking tendency, 68 kg/mm² Young's modulus, 122.6° C. heat sealing temperature, no blooming, and 128.0° C. hot tack temperature.

Comparative Example 2

A copolymer obtained by using the magnesium chloride-carried catalyst of Example 2 and having an isotactic structure was employed as a propylene-butene-1 copolymer.

The copolymer showed almost no absorption at about 26.9 ppm and a maximum intensity (about 0.7 of an absorption intensity of the whole methylene groups) was observed at about 27.8 ppm. The content of propylene units was 10.5 wt.% and η was 0.7. Evaluation was conducted in a similar manner to Example 2 except for the use of the copolymer. The film had 2.2% haze, 10% blocking tendency, 63 kg/mm² Young's modulus, 128.5° C. heat-sealing temperature, no blooming, and 130.0° C. hot tack temperature. The Young's modulus was much smaller and the hot tack was somewhat inferior.

COMPARATIVE EXAMPLE 3

In a similar manner to the preparation of the propylene copolymer in Example 2 except that the vapor-phase concentration of ethylene was controlled at 3.6 mole %, a propylene-ethylene-butene-1 copolymer containing 4.5 wt.% ethylene units and 1.5 wt.% butene-1 units was obtained. The copolymer was then formed into a film as was, namely, without blending the propylenebutene-1 copolymer. The film had 1.7% haze, 10% blocking tendency, 50 kg/mm² Young's modulus, 124.6° C. heatsealing temperature, no blooming, and 135.0° C. hot tack temperature. Similar heat sealability to the film of Example 2 was exhibited by increasing the ethylene content. However, the Young's modulus was significantly reduced and the hot tack was poor.

EXAMPLE 3

A butene-1-propylene copolymer having a propylene content of 17.2 wt.% was obtained in a similar manner to Example 1 except that propylene was used in an amount of 50 g. Its η was 0.82. The intensity of an absorption observed at about 26.9 ppm was 0.62 of the intensity of an absorption at about 27.8-26.0 ppm. A resin composition obtained in a similar manner to Example 1 except for the use of the copolymer was formed into a film, and its physical properties were measured. The film had 2.0% haze, 15% blocking tendency, 67 kg/mm² Young's modulus, 118.5° C. heat-sealing temperature, no blooming, and 119.5° C. hot tack temperature.

EXAMPLE 4

Using the catalyst of the same type as that employed in Example 1, 100 g of propylene, 5 g of butene-1 and 2 g of ethylene were charged under pressure into a 2 l autoclave. They were polymerized at 20° C. for 1 hour. The procedure of Example 1 was thereafter followed, whereby a propylene-ethylene-butene-1 copolymer containing 1.8% of ethylene units and 2.5% of butene-1 units was obtained.

The η of the copolymer was 1.25, while its melt flow index was 7.2. On a $^{13}$C-NMR spectrum, the intensity of an absorption observed at about 20.2 ppm using tetramethylsilane as a standard was at least 0.75 of the intensity of a full absorption attributed to the methyl groups of propylene units. The copolymer substantially had a syndiotactic structure.

A resin composition obtained from the copolymer as in Example 2 was formed into a film. The physical properties of the film were measured, indicating 1.5% haze, 20% blocking tendency, 48 kg/mm² Young's modulus, 95° C. heat-sealing temperature, no blooming, and 98° C. hot tack temperature.

What is claimed is:

1. A copolymer of butene-1 and propylene, wherein, of an absorption of the side-chain methylene groups of butene-1 units of said copolymer as measured in the form of a 1,2,4-trichlorobenzene solution by $^{13}$C-NMR, the intensity of an absorption observed at about 26.9 ppm using tetramethylsilane as a standard is at least 0.3 of the intensity of a full absorption of the side-chain methylene groups observed at about 27.8-26.0 ppm using tetramethylsilane as a standard; the content of propylene units ranges from 0.1 wt.% to 20 wt.%; and the intrinsic viscosity as measured at 135° C. in the form of a tetralin solution is at least 0.05.

2. The copolymer of claim 1, wherein the content of propylene units ranges from 1 wt.% to 20 wt.%.

3. The copolymer of claim 1, wherein the copolymer has a number-average molecular weight of at least 1,000 as measured by gel permeation chromatography in propylene.

4. The copolymer of claim 1, wherein the ratio of the weight-average molecular weight of the copolymer to the number-average molecular weight of the copolymer is 1.5–10.

* * * * *